United States Patent [19]
Howitt

[11] Patent Number: 5,157,485
[45] Date of Patent: Oct. 20, 1992

[54] VIDEO SPIN ART MACHINE

[76] Inventor: Philip W. Howitt, 3506 Federal Ave., Los Angeles, Calif. 90066

[21] Appl. No.: 638,687

[22] Filed: Jan. 8, 1991

[51] Int. Cl.$^5$ .............................................. H04N 7/18
[52] U.S. Cl. ........................................ 358/93; 358/101
[58] Field of Search .................... 358/93, 101, 229, 87

[56] References Cited
U.S. PATENT DOCUMENTS

| | | | |
|---|---|---|---|
| 2,905,758 | 9/1959 | Walker | 358/225 X |
| 4,153,917 | 5/1979 | Catano | 358/87 X |

Primary Examiner—Victor R. Kostak
Attorney, Agent, or Firm—Lyon & Lyon

[57] ABSTRACT

A video spin art machine has a frame with an easel rotatably mounted within the frame. A video camera is supported within a camera housing rotatably mounted within the frame and with the lens of the camera aligned with the center of rotation of the easel. A motor drives the easel and camera at the same rotational velocity. A slip ring assembly provides power input and video image signal output between the stationary frame and rotating camera. Since the camera spins at the same speed as the easel, the artist has a stationary image of the spinning artwork on a video monitor provided with the machine and can adjust the colors, positions and quantity of paints or medium applied to the easel, during creation of the artwork.

7 Claims, 1 Drawing Sheet

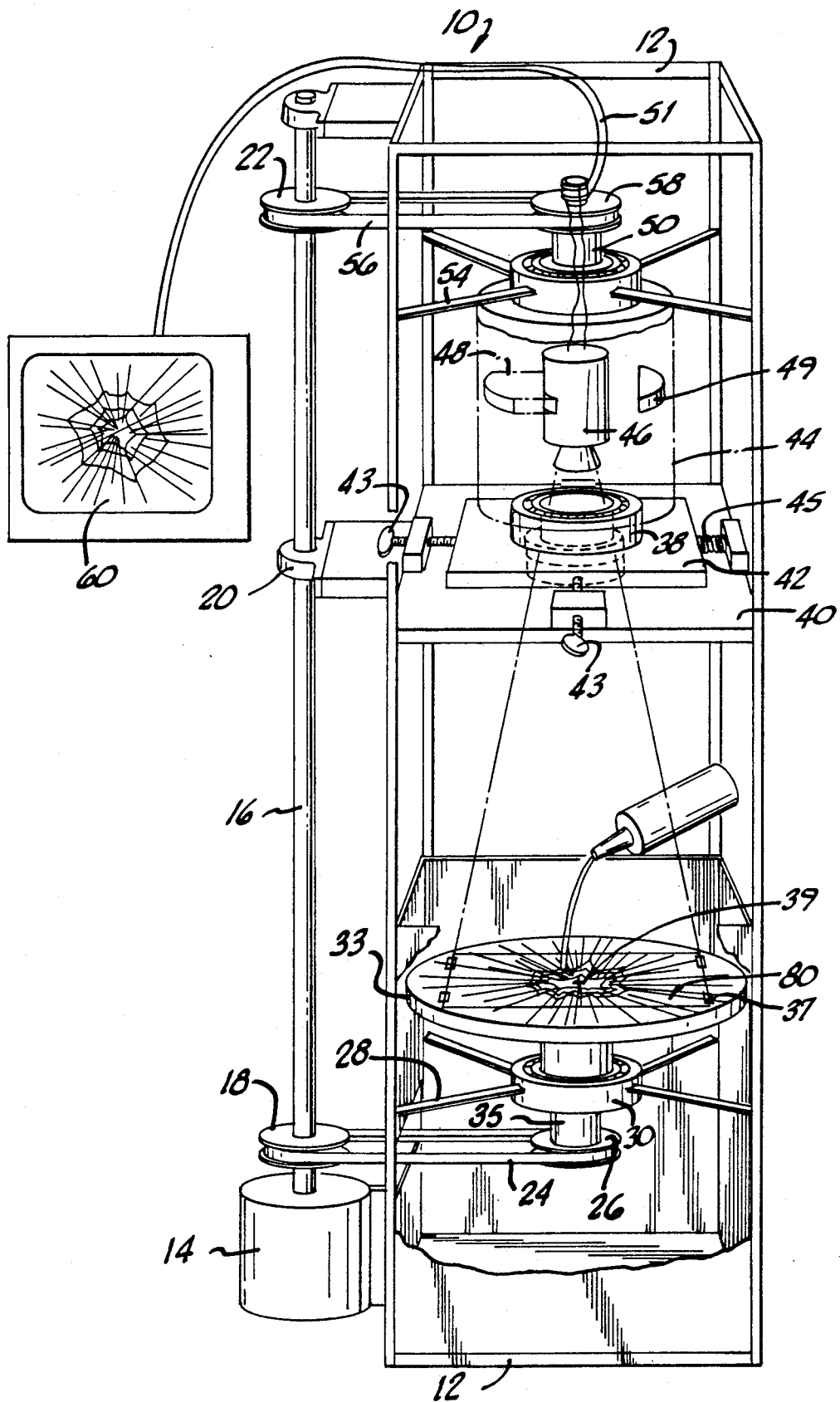

VIDEO SPIN ART MACHINE

BACKGROUND OF THE INVENTION

Spin art is a graphic art form. The artist uses a spinning platform (called an easel), upon which is placed a piece of paper. The platform spins to a high speed, so that the paper appears to be a blur. The artist then applies paint by using a plastic squeeze bottle. Paint is dripped or sprayed onto the spinning paper. When it hits the paper, due to centrifugal forces, the paint spreads outward in pleasing geometric patterns. The spinning easel is stopped and the finished artwork is removed.

The technology of spin art is well established and has been generally available in the public domain for many years. It is typically found in a concession both at carnivals, art shows and other public events.

As it currently exists, spin art is limited because the artist cannot see what he has created until the spinning easel is stopped. He cannot adjust the application of the paint to achieve certain effects because the blur of the spinning paper makes it impossible to ascertain what is happening to the paint.

Accordingly, it is an object of the invention to provide an improved spin art machine which allows the artist to view the work as it is being created. Other objects and features will appear hereinafter.

SUMMARY OF THE INVENTION

To this end, in a video spin art machine, a video camera is mounted directly above a spinning easel. The camera spins inside a steel cylinder joined to a frame by ball bearings. The camera and cylinder are made to spin in exact synchrony with the easel, through an arrangement of pulleys and v-belts or other mechanical equivalents. The video signal from the camera passes via wires through a slip ring assembly fixed to the machine frame and is displayed on regular television monitor.

BRIEF DESCRIPTION OF THE DRAWING

Other objects and features of the present invention will become apparent from the following detailed description taken in connection with the accompanying drawing which discloses one embodiment of the invention. It is to be understood, however, that the drawing is designed for the purpose of illustration only and is not intended as a definition of the limits of the invention.

The drawing is a schematically illustrated side elevation view of the present video spin art machine.

DETAILED DESCRIPTION OF THE PREFERRED EMBODIMENT

Referring to the figure, the present video spin art machine has a frame 12. An electric motor 14 has a vertical drive shaft 16. A pillow block bearing 20 supports the drive shaft 16 to the frame 12 at approximately the mid point of the drive shaft. Pulleys 18 and 22 are fixed to the drive shaft. A support 28 attached to the frame 12 holds a ball bearing 30 which rotatably supports an easel 32. The easel 32 has a generally round platen 33 and a stem shaft 35 which extends through the bearing 30. A pulley 26 is attached to the stem shaft 35. A v-belt connects the pulley 18 on the drive shaft 16 to the pulley 26 attached to the easel 32. Spaced apart about the center of rotation 39 of the easel 32 are retainer clips 37 for holding a work piece, e.g., a piece of paper onto the platen 33.

Vertically above the easel 32 on the frame 12 is a positioning plate 40. A ball bearing 38 is generally centered on the positioning plate 40 and supports the lower end of a rotatable camera housing 44 preferably a steel cylinder or pipe section. Inside of the camera housing 44 is a video camera 46 secured to the housing 44 through a bracket 48. Counterweights 49 are provided within the camera housing 44 to prevent excessive eccentric loading when the camera housing 44 spins. The video camera 46 is preferably a color tv camera, specifically a Hitachi Densi Limited Model VKC-150, having a cross section about its rotating axis of approximately 2 inches by 2 inches. The small dimensions allow the camera to spin at high speed without internal damage or degraded performance.

The top end of the camera housing 44 is supported by top ball bearing 52 held in position within the frame 12 by bracket plate 54. A shaft extension 55 extends from the camera housing 44 through the top ball bearing 52. A pulley 58 is attached to the shaft extension 55 and is linked to the pulley 22 and the drive shaft 16 by belt 56. The pulleys 18 and 26 and 22 and 58 can be of varying diameters so long as the ratios cause the camera 46 and easel 32 to spin at the same speed. A slip ring assembly 60 is centrally attached to the pulley 58. An electrical cable 50 extends from the slip ring assembly 60 to the camera 46 to provide camera power input and video signal output. Electrical cable 51 extends from the slip ring assembly 60 with a video signal cable connecting to a video monitor 60 and the power input cable linked to a power source.

In operation, the exact alignment of the axis of rotation between the camera housing and the easel is critical to the success of the machine. If the two axes are not aligned, the television image vibrates and is not usable. In other words, the principal focal axis of the lens of the video camera must be colinear with the center of rotation of the easel. By using a mechanism of thumbscrews 43 and opposing springs 45, the camera housing 44 can be manipulated on an X- and Y-axis in relation to the machine frame 12. By watching the television image vary in clarity as the thumbscrews 43 are adjusted, the two rotational axes can be brought into alignment.

The paper or workpiece is mounted to the easel with small clips or tacks 37, so that it does not fly away from the easel as the rotation speed is increased. The motor 14 is switched on and spins up the easel 32 and camera 46 preferably to about 1200 RPM.

The image on the monitor is stable and shows the work of art as it is spinning and being created since the camera is spinning with the turntable. By watching the monitor while applying the paint, the artist has the opportunity to vary the application techniques to create the optimum effect.

Among the factors affecting the outcome of a particular artwork would be the viscosity of the paint. As the artist reduces the viscosity of the paint with thinner, the various colors mix differently when applied to the paper. By varying the paint viscosity, the artist can manipulate the amount of detail in the art.

Another technique that can be used by the artist is to apply the paint to the paper when it is still, and then spin the colors together, while watching the process on the television. The spinning can be stopped and restarted until the artwork is completed. Additionally, the paper can be replaced with a plastic, rubber, or glass sheet which can be used to transfer the image to clothing in pressing operation.

Thus, while only a single embodiment of the present invention has been shown and described, it will be obvious that many changes and modifications may be made thereunto, without departing from the spirit and scope of the invention.

I claim:

1. A video spin art machine comprising:
   a frame;
   an easel rotatable within the frame;
   means for rotating the easel at a selected rotational velocity;
   a video camera having a lens facing the easel;
   means for rotating the camera at the selected rotational velocity;
   a video monitor linked to the video camera.

2. The machine of claim 1 further comprising holding means for holding a workpiece to the easel.

3. The machine of claim 1 further comprising means for axially aligning the camera with a center point on the easel.

4. The machine of claim 1 further comprising a camera housing around the camera.

5. The machine of claim I wherein the mean for rotating the easel at a selected rotational velocity comprises an electric motor attached to a drive shaft linked to the easel through a first belt and a first set of pulleys.

6. The machine of claim 5 wherein the means for rotating the camera at the selected rotational velocity comprises a second belt and a second set of pulleys linking the camera to the drive shaft.

7. A video spin art machine comprising:
   a frame;
   an easel rotatably mounted within the frame;
   a video camera supported within a camera housing rotatably mounted within the frame, the video camera having a lens substantially axially aligned with a center of rotation of the easel;
   a slip ring assembly attached to the camera housing;
   a video monitor electrically connectable to the video camera through the slip ring assembly; and
   a motor attached to the frame and having a drive shaft drivably connected to the easel and the camera housing.

* * * * *